United States Patent
Nakano et al.

(10) Patent No.: US 7,437,585 B2
(45) Date of Patent: Oct. 14, 2008

(54) STORAGE SYSTEM AND POWER CONTROL METHOD THEREFOR, ADAPTER AND POWER CONTROL METHOD THEREFOR, AND STORAGE CONTROLLER AND CONTROL METHOD THEREFOR

(75) Inventors: Akiyoshi Nakano, Odawara (JP); Kiyoshi Honda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 417 days.

(21) Appl. No.: 11/139,593

(22) Filed: May 31, 2005

(65) Prior Publication Data
US 2006/0174150 A1 Aug. 3, 2006

(30) Foreign Application Priority Data
Feb. 1, 2005 (JP) .............................. 2005-025597

(51) Int. Cl.
*G06F 1/26* (2006.01)
(52) U.S. Cl. .................. 713/330; 713/310; 711/118
(58) Field of Classification Search ................ 713/330, 713/310; 711/118
See application file for complete search history.

(56) References Cited

U.S. PATENT DOCUMENTS 6,279,060 B1 * 8/2001 Luke et al. .................. 710/64
7,254,724 B2 * 8/2007 Payne .......................... 713/320
2002/0178143 A1 11/2002 Fujimoto
2004/0068672 A1 * 4/2004 Fisk et al. .................... 713/323
2004/0103099 A1 * 5/2004 Minagawa .................... 707/10

FOREIGN PATENT DOCUMENTS

JP 2002-351703 12/2002

* cited by examiner

*Primary Examiner*—Thuan N Du
(74) *Attorney, Agent, or Firm*—Antonelli, Terry, Stout & Kraus, LLP.

(57) ABSTRACT

A storage system and a power control method therefor, an adapter and power control therefor, and a storage controller and a control method therefor, that enable the enhancement of their reliability with simple configurations. The storage system and the power control method therefor are configured in such a manner that the storage controller transmits a predetermined start-up completion signal to the adapter and the adapter starts to operate after receiving the start-up completion signal. When the adapter initiates stop of operation, it transfers cache data to the storage controller and transmits a predetermined first signal to the storage controller, the storage controller makes storage devices store the cache data in response to the first signal from the adapter, transmits a predetermined second signal to the adapter, and stops operation, and the adapter stops operation after receiving the second signal.

14 Claims, 10 Drawing Sheets

(A)  (B)

(A)

(B)

(A)

(B)

STORAGE SYSTEM AND POWER CONTROL METHOD THEREFOR, ADAPTER AND POWER CONTROL METHOD THEREFOR, AND STORAGE CONTROLLER AND CONTROL METHOD THEREFOR

CROSS-REFERENCES TO RELATED APPLICATIONS

This application relates to and claims priority from Japanese Patent Application No. 2005-25597, filed on Feb. 1, 2005, the entire disclosure of which is incorporated herein by reference.

BACKGROUND OF THE INVENTION

The present invention relates to a storage system and a power control method therefor, an adapter and a power control method therefor, and a storage controller and a control method therefor. The present invention is preferably used for a storage system composed of, for example, a Network Attached Storage (NAS) head and a disk array device.

Lately, the amount of data dealt with in a computer system has increased dramatically. For the effective use and management of the enormous amount of data, a technique has been developed by which a plurality of disk array devices and host computers are connected to one another via a dedicated network called a SAN (Storage Area Network), thereby enabling a massive number of high-speed accesses to the disk array devices. In order to connect the disk array devices and the host computer(s) using the SAN and enabling high-speed data transfer, it is common to configure a network using communication devices that are subject to a fiber channel protocol.

On the other hand, a network system called NAS has been developed in which a plurality of disk array devices and host computer(s) are connected to one another via a network using a Transmission Control Protocol/Internet Protocol (TCP/IP) protocol, thereby enabling file-level access to the disk array devices.

In the NAS network system, devices called NAS heads having a TCP/IP communication function and a file system function are arranged between the network and the respective disk array devices, thereby enabling data access from the host computer(s) file by file (For example, Japanese Patent Application Laid-Open No. 2002-351703). Recently, special attention has been focused on a grand-scale NAS network system where a file system is integrated with disk array devices that are managed by a Redundant Arrays of Inexpensive Disks (this is a set word) (RAID) system for providing storage resources of a huge size, called midrange class or enterprise class.

SUMMARY OF THE INVENTION

In the aforementioned NAS network system, when a disk array device is configured with a large-scale RAID device, a NAS head may have a blade structure and be placed in a predetermined position so that the NAS head and a control board for the disk array device are connected to a common power source.

On the other hand, when a disk array device is configured with, for example, a midrange-class RAID device which has no NAS head equipped as standard, the NAS head and the disk array device are configured as separate devices, accordingly, power has to be supplied to the NAS head using a different system from that of the disk array device.

However, when the NAS head and the disk array device have different power systems, power-on/power-off for both are conducted asynchronously. Therefore, there are problems in that when the power is turned on, the NAS head starts to operate before the disk array device, and when the power is turned off, the disk array device stops operation before the NAS head.

When these problems occur, even though the disk array device has stopped operating and access can no longer be made to file data stored and retained in the disk array device, the NAS head is recognized by the host computer(s) connected to the NAS network system.

Consequently, the problem of repeated file name-specific data access requests (file-by-file data input/output requests, hereinafter called "file access request(s)") being made from the host computer(s) to the NAS head and, in the worst case, the loss of data transmitted together with a file access request to the NAS head may arise.

On the other hand, a method for cooperation-control of the power sources of a plurality of devices using a controller has been conventionally suggested in, for example, Japanese Patent Laid-Open Publication No. H10-98839. If this method is used for cooperation-control of the power sources of the NAS head and the disk array device, the aforementioned problem due to the asynchronous power-on/power-off of the NAS head and the disk array device can be prevented, and the reliability of the storage system unit composed of the NAS head and the disk array device can be enhanced, which in turn enhances the reliability of the entire NAS network system.

However, according to the method disclosed in the above Japanese Patent Laid-Open Publication, a controller is separately needed for controlling the power-supply timing to the NAS head and the disk array device; accordingly, the structure of the entire storage system unit, which is composed of the NAS head and the disk array device, grows massive in size and the manufacturing costs increase too.

Moreover, the above method requires routing work for connecting the NAS head and the disk array device to the controller and increases service parts. Furthermore, the controller controls the power-supply timing for the NAS head and the disk array device, making it synchronous at all times. Therefore, for example, when a plurality of disk array devices are connected to one NAS head and if one of the disk array devices causes trouble, the power supply has to be stopped to the NAS head as well as all of the disk array devices.

The present invention was made considering the above points and aims to suggest a storage system and a power control method therefor, an adapter and a power control method therefore, and a storage controller and a control method therefor, that can enhance reliability with simple configurations.

In order to achieve the above object, the present invention provides a storage system having a storage controller for storing data and an adapter for controlling data input/output between a host system and the storage controller, wherein the storage controller transmits a predetermined start-up completion signal to the adapter after it starts to operate; and the adapter starts to operate after receiving the start-up completion signal from the storage controller.

Consequently, in this storage system, the adapter starts to operate after the start-up of the storage controller. Accordingly, even when the power-on timing is different between the storage controller and the adapter, the problem arising from the situation where the adapter starts to operate earlier than the storage controller can be prevented, thereby realizing a storage system having enhanced reliability with a simple configuration.

Moreover, the present invention provides a storage system having a storage controller and an adapter for controlling input/output of data between a host system and the storage controller, wherein the storage controller having a storage device for storing the data, and a first cache memory for temporarily storing the data when it is transferred between the adapter and the storage device; the adapter having a second cache memory for temporarily storing the data when it is transferred between the host system and the storage controller; wherein, when the adapter initiates stop of operation, it transfers the data stored in the second cache memory to the storage controller, and transmits a predetermined first signal to the storage controller; wherein, in response to the first signal from the adapter, the storage controller has the storage device store the data stored in the first cache memory, transmits a predetermined second signal to the adapter, and stops operation; and wherein, the adapter stops operation after receiving the second signal.

Consequently, in this storage system, because the storage controller and the adapter are powered off in a cooperative manner, even when the power-off timing is different between the storage controller and the adapter, the problem arising from the situation where the storage controller stops operation before the adapter and only the adapter keeps operating can be prevented. Moreover, because the storage controller and the adapter save the data in their respective cache memories, data loss when they stop operation can be prevented. Accordingly, it is possible to realize a storage system having enhanced reliability with a simple configuration, Furthermore, the present invention provides a power control method for a storage system that has a storage controller for storing data and an adapter for controlling input/output of data between a host system and the storage controller, the method has: a first step in which the storage controller transmits a predetermined start-up completion signal to the adapter after it starts to operate; and a second step in which the adapter starts to operate after receiving the start-up completion signal from the storage controller.

Consequently, with this power control method for the storage system, because the adapter starts to operate after the start-up of the storage controller, even when the power-on timing is different between the storage controller and the adapter, the problem arising from the situation where the adapter starts to operate before the storage controller can be prevented. Therefore, it is possible to realize a power control method for the storage system having enhanced reliability with a simple configuration.

The present invention also provides a power control method for a storage system that has a storage controller and an adapter for controlling input/output of data to/from the storage controller in response to an external request for input/output of data in files, wherein; the storage controller has a storage device for storing data, and a first cache memory for temporarily storing the data when it is transferred between the adapter and the storage device; and the adapter has a second cache memory for temporarily storing the data when it is transferred between the outside and the storage controller, the method including; a first step in which, when the adapter initiates stop of operation, it transfers the data stored in the second cache memory to the storage controller, and transmits a predetermined first signal to the storage controller; a second step in which, in response to the first signal from the adapter, the storage controller has the storage device store the data stored in the first cache memory, transmits a predetermined second signal to the adapter, and stops operation; and a third step in which the adapter stops operation after receiving the second signal.

Consequently, with this power control method for the storage system, because the storage controller and the adapter can be powered off in a cooperative manner, even when the power-off timing is different between the storage controller and the adapter, the problem arising from the situation where the storage controller stops operation before the adapter and only the input/output devices keep operating can be prevented. Moreover, in this case, because the storage controller and the adapter save the data in their respective cache memories, data loss can be avoided. Accordingly, it is possible to realize a power control method for the storage system having enhanced reliability with a simple configuration.

Moreover, the present invention provides an adapter for controlling input/output of data between a host system and a storage controller for storing data, wherein the adapter starts to operate after receiving a predetermined start-up completion signal which is transmitted from the storage controller after the start-up of the storage controller.

Consequently, because this adapter starts to operate after the storage controller, even when the power-on timing is different between the storage controller and the adapter, the problem arising from the situation where the adapter starts to operate before the storage controller can be prevented, thereby realizing an adapter having enhanced reliability with a simple configuration.

Furthermore, the present invention provides an adapter for controlling input/output of data between a host system and a storage controller for storing data, the adapter having: a cache memory for temporarily storing the data when it is transferred between the host system and the storage controller, wherein, when the adapter initiates stop of operation, it transfers the data stored in the cache memory to the storage controller, transmits a predetermined first signal to the storage controller, receives a predetermined second signal that is transmitted in response to the first signal, from the storage controller before the storage controller stops operation, and stops operation.

Consequently, because the power-off of the adapter is executed in a cooperative manner with the power-off of the storage controller, even when the power-off timing is different between the storage controller and the adapter, the problem arising from the situation where the storage controller stops operation before the adapter and only input/output devices keep operating can be prevented. Moreover, because the adapter saves the data in the cache memory, data loss is prevented. Therefore, it is possible to realize an adapter having enhanced reliability with a simple configuration.

The present invention also provides a power control method for an adapter which controls input/output data between a host system and a storage controller for storing data, wherein the adapter starts to operate after receiving a predetermined start-up completion signal that is transmitted from the storage controller after the completion of the start-up processing of the storage controller.

Consequently, with the power control method for the adapter, because the adapter starts to operate after the storage controller, even when the power-on timing is different between the storage controller and the adapter, the problem arising from the situation where the adapter starts to operate before the storage controller can be prevented. Thereby, it is possible to realize a power control method for the adapter having enhanced reliability with a simple configuration.

Moreover, the present invention provides a power control method for an adapter that controls input/output of data between a host system and a storage controller for storing data, wherein the adapter has a cache memory for temporarily storing the data when it is transferred between the host system and the storage controller, the method includes: a first step of transferring, when the adapter initiates stop of operation, the data stored in the cache memory to the storage controller and transmitting a predetermined first signal from the adapter to the storage controller; and a second step of the adapter stopping operation after receiving a predetermined second signal that is transmitted, in response to the first signal, from the storage controller before the storage controller stops operation.

Consequently, with the power control method for the adapter, because the adapter and the storage controller are powered off in a cooperative manner, even when the power-off timing is different between the storage controller and the adapter, the problem arising from the situation where the storage controller stops operation before the adapter and only the input/output devices keep operating can be prevented. Moreover, in this case, because the adapter saves the data in the cache memory, data loss can be prevented. Accordingly, it is possible to realize a power control method for the adapter having enhanced reliability with a simple configuration.

Furthermore, the present invention provides a storage controller for storing data, wherein after the start-up of the storage controller, it transmits a predetermined start-up completion signal to an adapter that controls input/output of data between a host system and the storage controller.

Consequently, because the adapter is powered on in response to the start-up completion signal, the adapter starts to operate after the storage controller. Accordingly, even when the power-on timing is different between the storage controller and the adapter, the problem arising from the situation where the adapter starts to operate before the storage controller can be prevented. Accordingly, it is possible to realize a storage controller having enhanced reliability with a simple configuration.

The present invention also provides a storage controller having: a storage device for storing data transmitted from a host system; and a cache memory for temporarily storing the input/output of data to/from the storage device, wherein, in response to a first signal transmitted from an adapter before the adapter stops operation, the adapter controlling input/output of data between the host system and the storage device, the storage controller has the storage device store the data stored in the cache memory, transmits a predetermined second signal to the adapter, and stops operation.

Consequently, according to this storage controller, because the adapter is powered off in response to the second signal, the adapter and the storage controller are powered off in a cooperative manner. Accordingly, even when the power-off timing is different between the storage controller and the adapter, the problem arising from the situation where the storage controller stops operation before the adapter and only the input/output devices keep operating can be prevented. Moreover, in this case, because the storage controller saves the data in the cache memory, data loss can be prevented. Therefore, it is possible to realize a storage controller having enhanced reliability with a simple configuration.

Moreover, the present invention provides a control method for a storage controller which stores data, the method including starting up the storage controller, and transmitting a predetermined start-up completion signal to an adapter that controls input/output of data between a host system and the storage controller.

Consequently, because the adapter is powered on in response to the start-up completion signal, the adapter starts to operate after the storage controller. Therefore, even when the power-on timing is different between the storage controller and the adapter, the problem arising from the situation where the adapter starts to operate before the storage controller can be prevented.

Furthermore, the present invention provides a control method for a storage controller that has a storage device for storing data transmitted from a host system and a cache memory for temporarily storing the input/output of data to/from the storage device, the method including: a first step of having the storage device store the data stored in the cache memory, in response to a first signal that is transmitted from an adapter when the adapter initiates stop of operation, the adapter controlling input/output of data between the host system and the storage controller; and a second step of having the storage controller stop operation after transmitting a predetermined second signal to the adapter.

Consequently, with the control method for the storage controller, because the adapter is powered off in response to the second signal, the adapter and the storage controller are powered off in a cooperative manner. Accordingly, even when power-off timing is different between the storage controller and the adapter, the problem arising from the situation where the storage controller stops operation before the adapter and only the input/output devices keep operating can be prevented. Moreover, in this case, because the storage controller saves the data in the cache memory, data loss can be prevented. Therefore, it is possible to realize a control method for the storage controller enhancing the reliability with a simple configuration.

DETAILED DESCRIPTION OF THE INVENTION

Embodiments of the present invention will be hereinafter described in detail in relation to the drawings.

(1) FIRST EMBODIMENT

(1-1) NAS Network System Configuration According to First Embodiment

Figure 1:
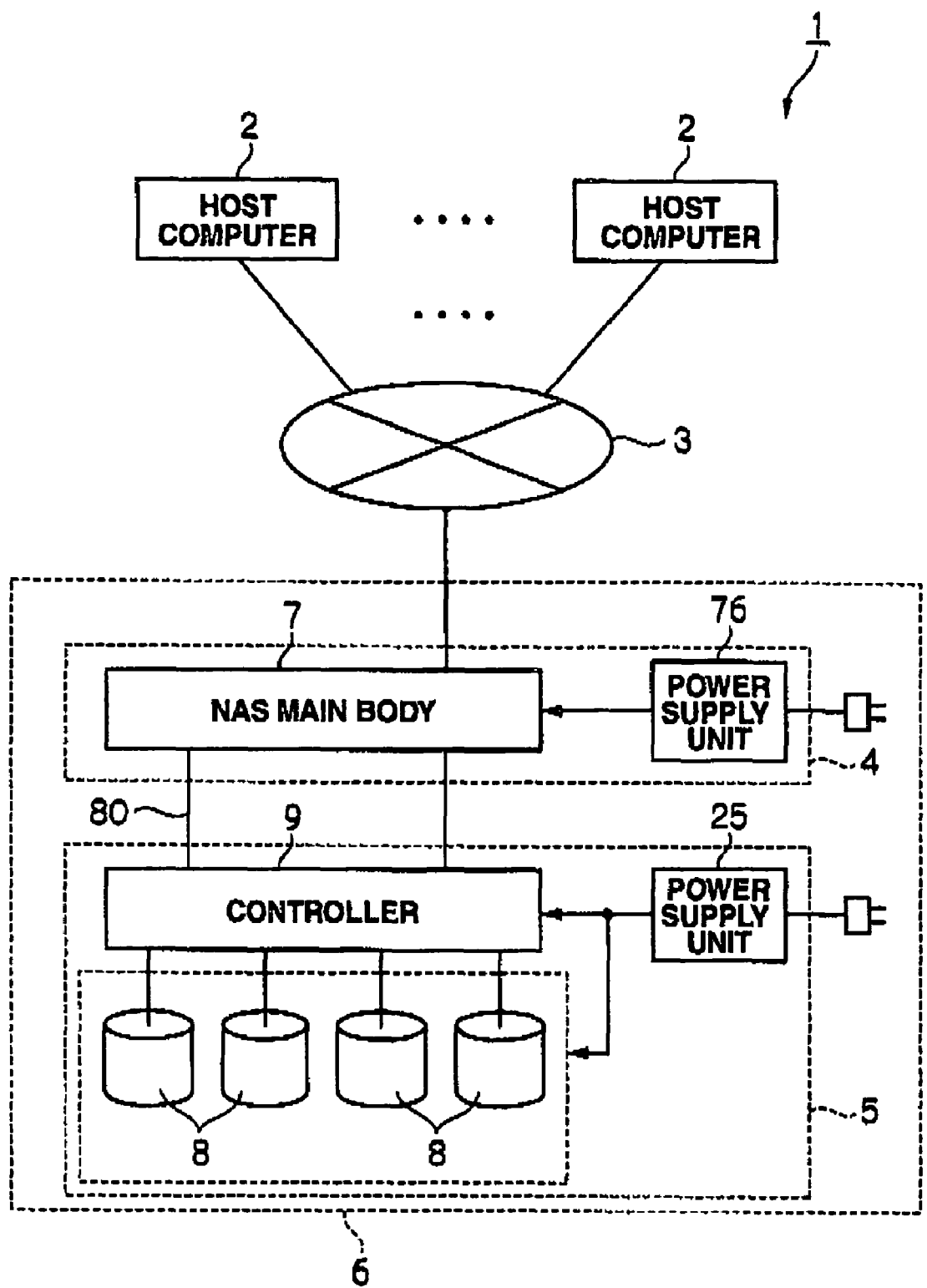
FIG. 1 is a block diagram showing a configuration of a NAS network system according to a first embodiment of the present invention.

In FIG. 1, the reference numeral 1 indicates an entire NAS network system according to the first embodiment, which has a configuration where a plurality of host computers 2 are connected via a Local Area Network (LAN) 3 to a storage system unit 6 which is composed of a NAS (Network Attached Storage) head 4 and a disk array device 5.

The host computers 2 are composed of personal computers or workstations, and in accordance with user operation and the like, transmit file access requests via the LAN 3 to the NAS head 4 in the storage system unit 6.

The NAS head 4 is composed of a NAS main body 7 and a power source unit 76 for supplying power to the NAS main body 7. The NAS main body 7 serves as an adapter device for controlling input/output of data between the host computers 2 and the disk array device 5, accepts file access requests from the host computers 2, and transmits input/output requests, which correspond to the file access requests, to the disk array device 5. The input/output requests include access types such as read or write, as well as, when data writing is requested, write target data transmitted from a host computer with a file access request.

When a file access request from a host computer 2 is a data read request, the NAS main body 7 transmits, file by file via the LAN 3 to the host computer 2, data read out of disk drive(s) 8 and transmitted from the disk array device 5 in response to the input/output request. The disk drive(s) 8 will be described later.

The disk array device is composed of: a plurality of disk drives (physical drives) B as storage devices managed by a RAID method; a controller 9 for controlling data reading and writing from/to the disk drives 8; and a power source unit 25 for supplying power to the respective disk drives 8 and the controller 9. In accordance with a data input/output request from the NAS head 4, the controller 9 controls the relevant disk drive(s) 8 so that they read specified data and transmit it to the NAS head 4 or, when the input/output request is a write request, write the data provided with the write request to hard disk(s) in the disk drive(s) 8.

When this happens, the data is stored in logical volume(s), which are storage areas logically set for physical storage areas provided by the disk drive(s) 8. Incidentally, the logical volumes set in the storage areas include: User logical volumes accessible from the host computers 2; and system logical volumes used for the NAS head 4, in which an operating system (OS) for the NAS head 4 is also stored.

(1-2) Specific Configuration of Storage System Unit 6

(1-2-1) External Configuration

Next, a specific configuration of the storage system unit 6, in the NAS network system 1, according to the present invention will be explained. FIGS. 2(A) and (B) show an external configuration of the storage system unit 6. As is clear from these figures, the storage system unit 6 is configured having both the NAS head 4 and the disk array device 5 contained in one rack frame 10.

In the rack frame 10, mount frames 11 are formed each extending from the inner sides of the rack frame 10, from the back to the front of the rack frame 10, thereby forming a plurality of levels from the bottom to the top of the rack frame 10. On these mount frames 11, the NAS head 4, and a basic chassis 20 and additional chassis 40 constituting the disk array device 5 are arranged in a withdrawable manner.

The NAS head 4 is arranged on the bottom level in the rack frame 10 and has, on its front face, a display panel 71 providing display devices such as a status LED 70 for displaying the operation mode of the NAS head 4, as shown in FIG. 2(A). On the back face, the NAS head 4 has: a connector 72 for the LAN 3; a connector 74 for connecting a cable 73 which transmits data between the NAS head 4 and the disk array device 5; and a breaker switch 75 for switching on/off the output of the power source unit 76 (FIG. 1), as shown in FIG. 2(B).

Figure 3:
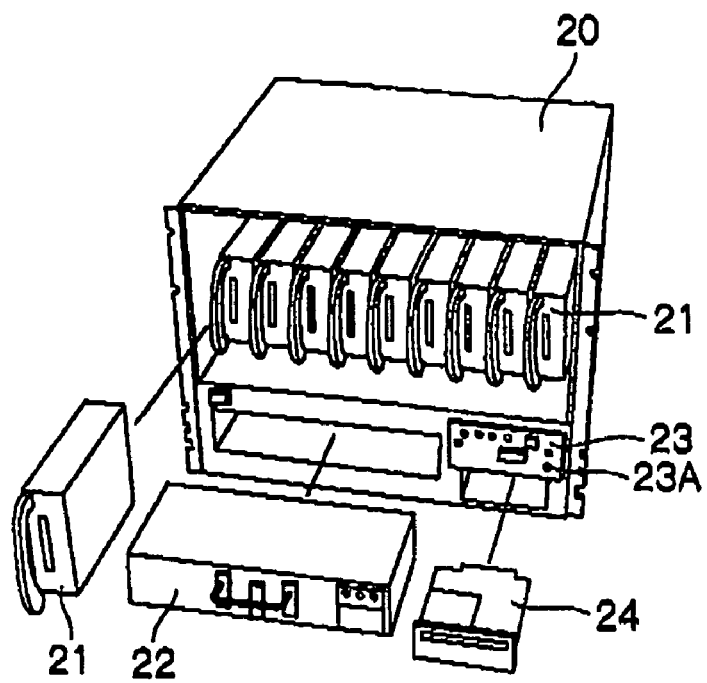
FIGS. 3(A) and (B) show an exploded perspective view of a configuration of a basic chassis of a disk array device.
Figure 3:
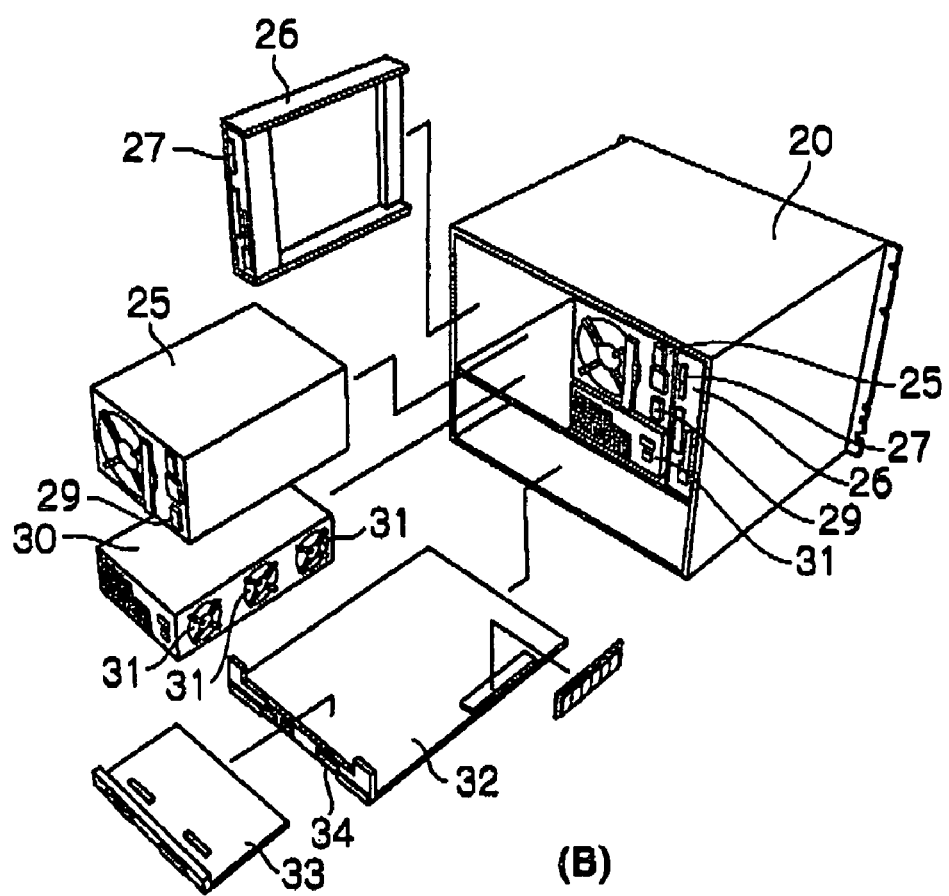

On the other hand, as shown in FIG. 3, the basic chassis 20 and the additional chassis 40 constituting the disk array device 5 have boards and units contained therein for providing the various functions of the disk array device 5.

As shown in FIG. 3(A), the basic chassis 20 has, on the front upper level, a plurality of disk drive units 21 having the disk drives 8 loaded therein, the disk drive units 21 being arranged side by side; and, on the front lower level, a battery unit 22, a display panel 23 for displaying the operation mode of the disk drives 8, and a flexible disk drive.

The battery unit 22 contains a secondary battery and serves as a backup power source for supplying power to the boards and the units during disruption of the power-supply from the power source unit 25 in blackout situations or similar. The display panel 23 provides display devices such as a status LED 23A for displaying the operation mode of the disk drives 8. The flexible disk drive 24 is used for, for example, loading a maintenance program.

Moreover, as shown in FIG. 3(B), the basic chassis 20 has, on the back upper level, two power control units 26 arranged at the respective sides, the power control units 26 constituting some parts of the controller mentioned above in relation to FIG. 1. The power control units 26 are connected to the plural disk drives 8 in a communication-enabling manner. They are connected to one another, in a communication-enabling manner, via a loop-type communication path, for example, a communication path that conducts communications by FC-AL (topology).

Each power control unit 26 has: a Port Bypass Circuit (PBC) 160 for controlling the FC-AL 150 formed between the disk drives 8; and circuits for monitoring the conditions of the power source units 25, the disk drives 8 and the temperature of the respective parts of the chassis, controlling the power-supply to the disk drives 8 and the cooling power of a cooler, as well as controlling the display devices on the display panel 23. Incidentally, the cooler cools down the inside of the disk array device 5, the chassis 20 and 40 and an inter-cooler, a heat sink, or an air-cooling fan, for example, is used as such.

Each power control unit 26 has a fiber-channel cable connecter 27, to which a fiber-channel cable 28 (FIG. 2(B)) constituting a part of the path for the FC-AL 150 is connected. FC-AL 150 is described in detail in, for example, "Fiber Channel Technology Guide" (edited by the Fiber Channel Technology Association, issued by Ronsosha), Japanese Patent Laid-Open Publication No. 2001-167040, Japanese Patent Laid-Open Publication No. 2001-337868, and Japanese Patent Laid-Open Publication No. 2001-222385.

In the space between the two power control units 26 on the back upper level in the basic chassis 20, two power source units 25 are arranged side by side. The power source units 25 are connected to the power control units 26 and are configured to supply power to the respective disk drives 8, boards, and units in response to the signals from the power control units 26. The power source units 25 are provided with breaker switches 29 for switching on/off their outputs.

Incidentally, in this first embodiment, each of the basic chassis 20 and the additional chassis 40 has two power control units 26 and two power source units 25 to provide redundancy to ensure security for the power supply to the chassis 20 and 40. However, it may have only one power control unit 26 and one power source unit 25.

Below the power source units 25, two air-cooling fan units 30 are arranged side by side. Each cooling fan unit 30 includes one or more cooling fans 31. The cooling fans 31 take air into and out of the chassis so that the heat from the disk drives 8 and the power source units 25 is removed from the chassis. Incidentally, the basic chassis 20 and the additional chassis 40 as well as the boards and units arranged therein have ventilating paths or openings for circulating air so that the heat inside the chassis 20 and 40 is effectively removed to the outside by means of the cooling fans 31. The cooling fans 31 may be provided to the respective disk drives 8, however, it is preferable to provide a large cooling fan 31 for each chassis so that the number of chips and units can be reduced.

The cooling fan units 30 are connected to a controller board 32 or the power control units 26 via a control line (not shown in the figure) and the number of revolutions of the cooling fans 31 in the cooling fan units 30 are controlled by the controller board 32 or the power control units 26 via the control line.

Figure 9:
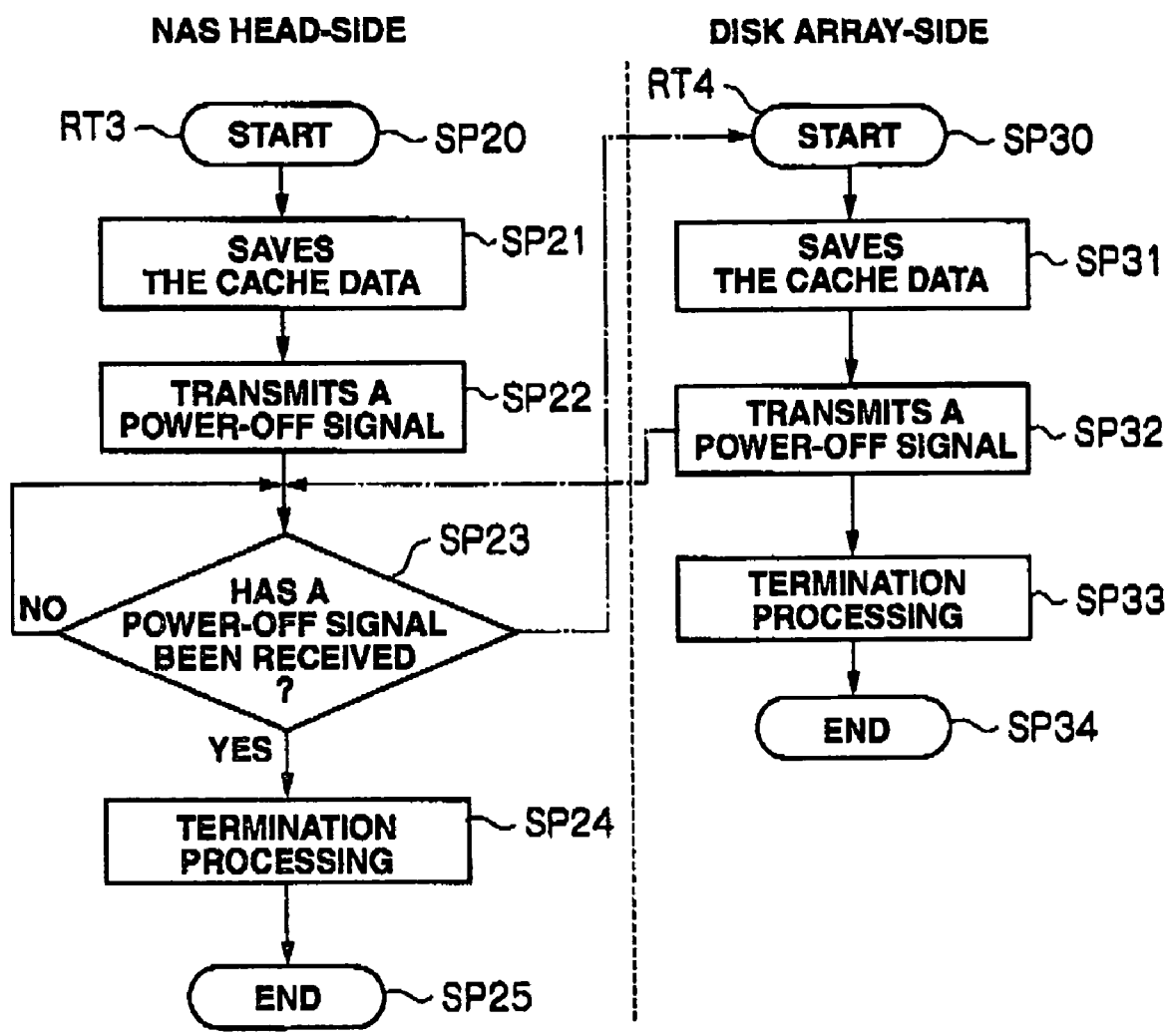
FIG. 9 is a flow chart illustrating a power-off procedure realized at the NAS head MPU and the disk array device MPU by the power source cooperation-control function according to the first embodiment.

On the back lower level, the basic chassis 20 has one controller board 32, which constitutes a part of the aforementioned controller 9 (FIG. 9). The controller board 32 has: a communication interface for communication with the disk drives 8 loaded in the basic chassis 20 and the additional chassis 40; and a circuit for controlling the operation of the disk drives 8 (for example, controls according to the RAID system) and monitoring the condition of the disk drives 8.

A communication interface board 33, which is mounted on the controller board 32, has, in addition to external connectors 34 compatible with the LAN 3, external connectors 34 complying with a predetermined interface standard such as Storage Area Network (SAN) or SCSI configured according to a protocol such as a fiber channel or Ethernet (registered trademark). Incidentally, two controller boards 32 may be provided in order to provide redundancy to ensure security for the controls of the disk drives 8 in the basic chassis 20.

As shown in FIG. 4(A), an additional chassis 40 has, at the front, a plurality of disk drive units 21 having the disk drives 8 loaded therein, the disk drive units being arranged side by side. Moreover, as FIG. 4(B) shows, the additional chassis 40 has, on the sides at the back, two power control units 26, each forming a part of the aforementioned controller 9. In the space between the two power control units 26, two power source units 25 are arranged side by side. Below the power source units 25, two cooling fan units 30 are mounted side by side. The power source units 25 have breaker switches 29 for switching on/off their outputs.

In this first embodiment, as already mentioned above, the additional chassis 40 has two power control units 26 and two power source units 25 to provide redundancy to ensure security for the power-supply thereto. However, it may have only one power control unit 26 and only one power source unit 25. Incidentally, the controller board 32 (FIG. 3(B)) may provide the functions of the power control unit 26 for controlling the power-supply to the disk drives 8, and the cooling power of the cooling devices.

(1-2-2) Internal Configuration

Figure 5:
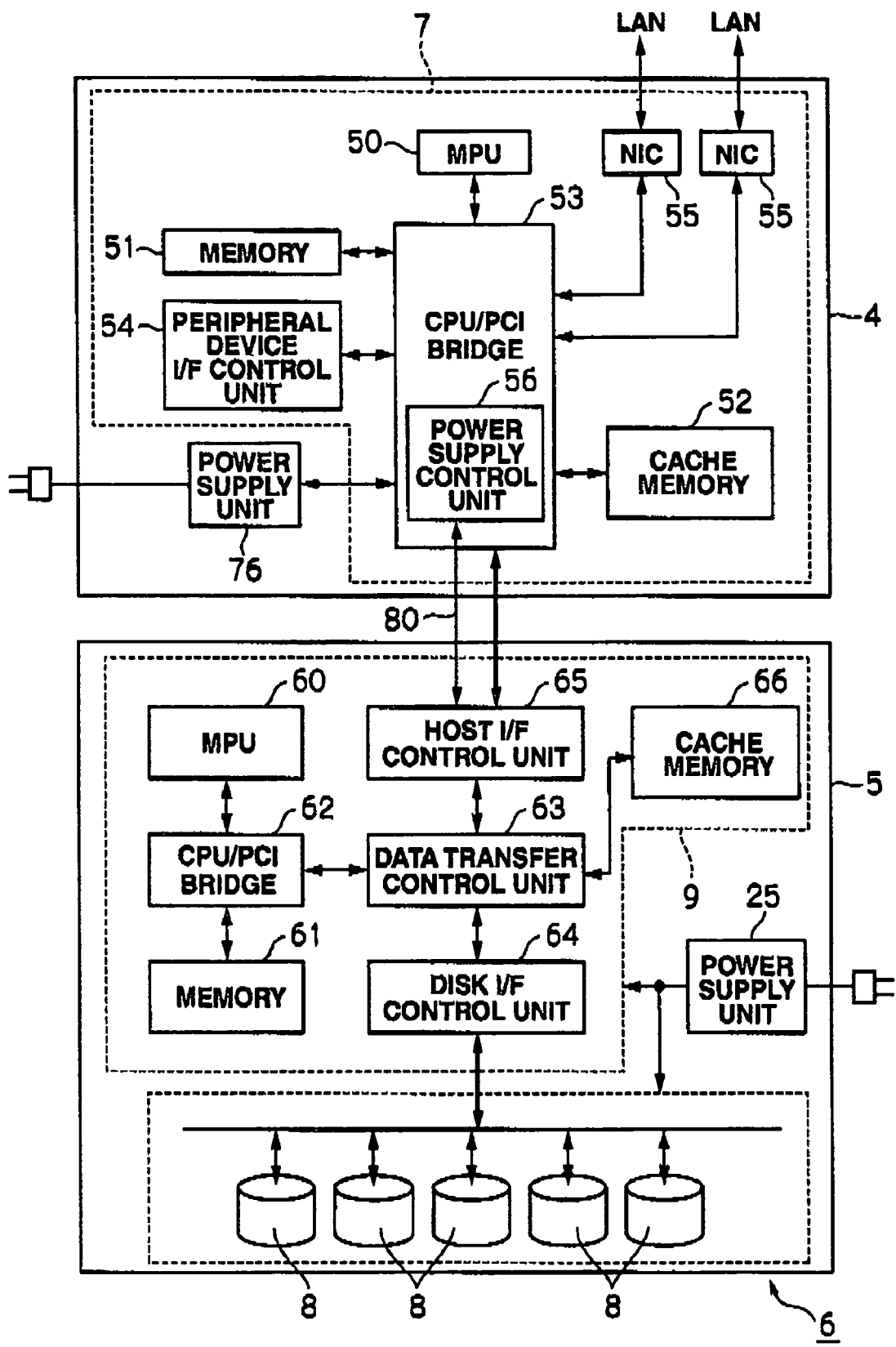
FIG. 5 shows a block diagram showing an internal configuration of the storage system unit.
Figure 6:
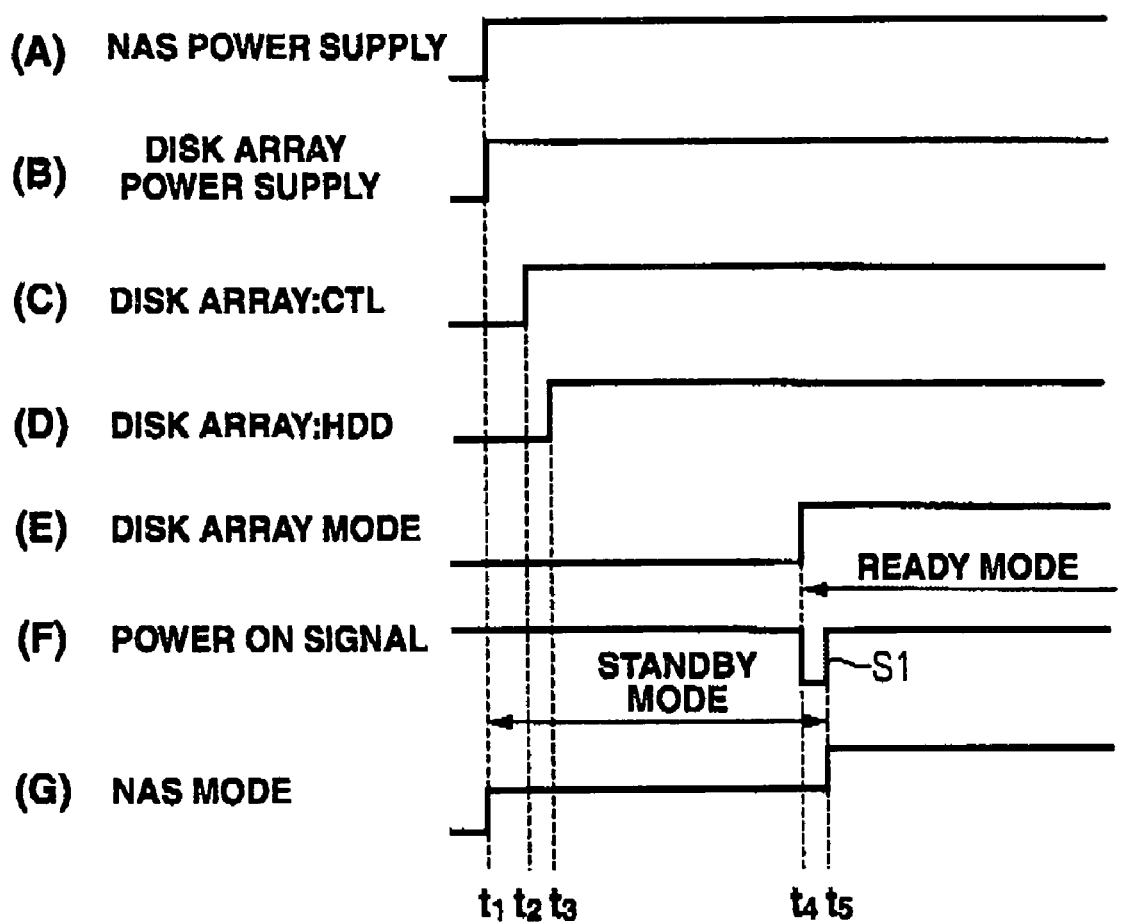
FIG. 6 is a timing chart illustrating a power-on sequence realized by a power source cooperation-control function according to the first embodiment.

FIG. 5 shows an internal configuration of the storage system unit 6. As is clear from this figure, the NAS main body 7 of the NAS head 4 has a configuration, in which, a Micro Processing Unit (MPU) 50 (controller) in charge of controlling the operations of the entire NAS head 4, a memory 51 storing various programs and predetermined management information for managing file data stored in the disk drives 8 in the disk array device 5, and a cache memory 52 for temporarily storing data when it is transferred between the host computers 2 and the disk array device 5 are connected to one another via a Central Processing Unit/Peripheral Component Interconnect (CPU/PCI) bridge 53; and a peripheral device interface control unit 54 in charge of controlling peripheral devices, and Network Interface Cards (NICs) 55, which are LAN connection boards, are connected to the CPU/PCI bridge 53 via a PCI bus. In the CPU/PCI bridge 53, a power control unit 56 is provided for controlling the power-supply to the MPU 50, the peripheral device interface control unit 54 and the NICs 55.

The controller 9 in the disk array device 5 has a configuration in which an MPU 60 (first controller) in charge of controlling the operations of the entire disk array device 5 and a memory 61 for storing various programs and predetermined management information for managing the file data stored in the disk drives 8 are connected to one another via a CPU/PCI bridge 62; a data transfer control unit 63 for controlling data transfer between the disk drives 8 and the NAS head 4 is connected to the CPU/PCI bridge 62 via a PCI bus; and a disk interface control Unit 64 for controlling protocols between the controller 9 and the respective disk drives 8, a host interface control unit 65 for controlling protocols between the NAS head 4 and the disk array device 5, and a cache memory 66 for temporarily storing data when it is transferred between the NAS head 4 and the disk drives 8 are connected to the data transfer control unit 63.

When a NIC 55 in the NAS head 4 receives a file access request from any of the host computers 2, it transmits it via the CPU/PCI bridge 53 to the cache memory 52 to be stored therein.

When the file access request stored in the cache memory 52 is a file name-specific read request, the MPU 50 in the NAS head 4 generates, on the basis of the file access request and the management information stored in the memory 51, a read request for requesting block-by-block data reading (hereinafter called the "block read request"), blocks being data executive units in the storage areas in the disk drives 8, and transmits the read request via the CPU/PCI bridge 53 to the cache memory 52 to be stored therein. The MPU 50 then transmits, via the CPU/PCI bridge 53 to the disk array device 5, a request generation notification that an input/output request has been generated.

When the host interface control unit 65 in the disk array device 5 receives the request generation notification, it transmits it to the MPU 60 via the data transfer control unit 63 and the CPU/PCI bridge 62 in that order. When the MPU 60 receives the request generation notification and if the state of the MPU 60 allows the acceptance of the request, it notifies the MPU 50 in the NAS head 4 to that effect via the CPU/PCI bridge 62, the data transfer control unit 63, and the host interface control unit 65 in that order.

When the MPU 50 in the NAS head 4 receives the notification, it reads the block read request from the cache memory 52 and transmits it to the disk array device 5 via the CPU/PCI bridge 53. As a result, the block read request is stored in the cache memory 66 in the disk array device 5 under the control of the data transfer control unit 63 in the disk array device 5.

Subsequently, the MPU 60 in the disk array device 5 detects, on the basis of the block read request stored in the cache memory 66 and the management information stored in the memory 61, the disk drive(s) 8 and their physical addresses, in which the read target data is stored. Then, based on the detection result, the MPU 60 generates a block read request requesting that the relevant data be read, and transmits it to the cache memory 66 to be stored therein via the CPU/PCI bridge 62 and the data transfer control unit 63 in that order.

The read request stored in the cache memory 66 in the disk array device 5 is then read out from the cache memory 66 by the data transfer control unit 63 and transmitted to the relevant disk drive(s) 8 via the disk interface control unit 64. Consequently, the relevant data is read from the disk drive(s) 8 block by block. The data is then transmitted to the data transfer control unit 63 via the disk interface control unit 64 and stored in the cache memory 66 under the control of the data transfer control unit 63.

When this happens, the MPU 60 in the disk array device 5 transmits a data-transmission ready notification indicating that the data transmission preparations are complete, to the MPU 50 in the NAS head 4 via the CPU/PCI bridge 62, the data transfer control unit 63, and the host interface control unit 65 in that order. When the MPU 50 in the NAS head 4 receives the data-transmission ready notification, and if the state of the MPU 50 allows the acceptance of the data, it notifies the MPU 60 in the disk array device 5 to that effect via the CPU/PCI bridge 53.

When the MPU 60 in the disk array device 5 receives the notification, it controls the data transfer control unit 63 to make it read the data stored in the cache memory 66 and transmit it to the NAS head 4 via the host interface control unit 65.

The MPU 50 in the NAS head 4 transmits, via the CPU/PCI bridge 53, the data, which has been transmitted from the disk array device 5, to the cache memory 52 to be stored therein. Then the MPU 50 reads, file by file, the data thus stored in the cache memory 52 and transmits it to the relevant host computer 2 via an NIC 55.

On the other hand, when the file access request from the host computer 2 stored in the cache memory 52 is a data write request, the MPU 50 in the NAS head 4 generates a write request requesting block-by-block data writing (hereinafter called the "block write request") and transmits it via the CPU/PCI bridge 53 to the cache memory 52 to be stored therein. Then the MPU 50 transmits write target data transmitted from the host computer 2, via an NIC 55 and the CPU/PCI bridge 53 to the cache memory 52 to be stored therein. The MPU 50 then transmits, via the CPU/PCI bridge 53 to the disk array device 5, a request generation notification indicating that an input/output request has been generated.

When the host interface control unit 65 in the disk array device 5 receives the request generation notification from the NAS head 4, it transmits it to the MPU 60 via the data transfer control unit 63 and the CPU/PCI bridge 62 in that order. When the MPU 60 receives the request generation notification, and if the state of the MPU 60 allows the acceptance of the request, it notifies the MPU 50 in the NAS head 4 to that effect via the CPU/PCI bridge 62, the data transfer control unit 63, and the host interface control unit 65 in that order.

When the MPU 50 in the NAS head 4 receives the notification, it reads the block write request from the cache memory 52 and transmits it to the disk array device 5 via the CPU/PCI bridge 53. The MPU 50 also reads, block by block, the write target data from the cache memory 52 and transmits it to the disk array device 5 via the CPU/PCI bridge 53. As a result, the block write request and the write target data are stored in the cache memory 66 in the disk array device 5 under the control of the data transfer control unit 63 in the disk array device 5.

Subsequently, the MPU 60 in the disk array device 5 detects, on the basis of the block write request transmitted from the NAS head 4 and the management information stored in the memory 61, the disk drive(s) 8 and their physical addresses to which the write target data is going to be written. Then, based on the detection result, the MPU 60 generates a write request requesting that the data be written to the relevant disk drive(s) 8, and transmits it via the CPU/PCI bridge 62 and the data transfer control unit 63 to the cache memory 66 to be stored therein.

Then the write request and the write target data in blocks thus stored in the cache memory 66 in the disk array device 5 are read by the data transfer control unit 63 and transmitted to the relevant disk drive(s) 8 via the disk interface control unit 64. As a result, the write target data is written to hard disk(s) in the disk drive(s) 8 block by block.

As explained, in the storage system unit 6, in accordance with the file access requests from the host computer 2, specified file data is read from the disk drive(s) 8 in the disk array device 5 and transmitted to the host computers 2, and the write target data transmitted with the file access requests is written to the hard disk(s) in the disk drive(s) 8.

(1-2-3) Power Cooperation-Control Function

Next, the power cooperation-control function of the storage system unit 6 will be explained. The storage system unit 6 has a configuration where the NAS head 4 and the disk array device 5 are connected to each other via a dedicated cable 80, and has the power cooperation-control function, by which the NAS head 4 and the disk array device 5 transmit/receive, via the dedicated cable 80, signals instructing each other's power-on/power-off timing, thereby powering on/off the NAS head 4 and the disk array device 5 in a cooperative manner.

FIGS. 6(A) through (G) show a power-on sequence realized by the power cooperation-control function. At power-on, even when the breaker switch 75 (FIG. 2) in the power source unit 76 (FIG. 1) is switched on and the power is turned on (time $t_1$ in FIG. 6(A)), the NAS head 4 does not start to operate immediately but changes its operation mode to a standby mode, in which the host computers 2 cannot recognize the NAS head 4, and maintains the standby mode (time $t_1$ through $t_5$ in FIG. 6(G)).

On the other hand, when the breaker switches 27 (FIG. 2) of the power source units 25 (FIG. 2) of the basic chassis 20 (FIG. 2) are switched on and the power is turned on (time $t_1$ in FIG. 6(B)), the disk array device 5 starts to supply power to the controller 9 and the respective disk drives 8 in the basic chassis 20 and the additional chassis 40 and, in time, the controller 9 and the respective disk drives 8 start to operate (time $t_2$ in FIG. 6(C) and $t_3$ in (D)).

Then, when the disk array device 5 completes the start-up, it changes its operation mode to a ready mode, in which it waits for an input/output request from the NAS head 4 (time $t_4$ in FIG. 6(E)), and then transmits a start-up completion signal S1 to that effect to the NAS head 4 via the dedicated cable 80 (time $t_4$ in FIG. 6(F)).

Having received the start-up completion signal S1, the NAS head 4 starts start-up processing and changes its operation mode to a normal operating mode (time $t_5$ in FIG. 6(G)), and the NAS head 4 is then recognized by the host computers 2. When this happens, the disk array device 5 will have already been in the ready mode, and accordingly there will be no problem arising from the situation where only the NAS head 4 is operating.

Figure 7:
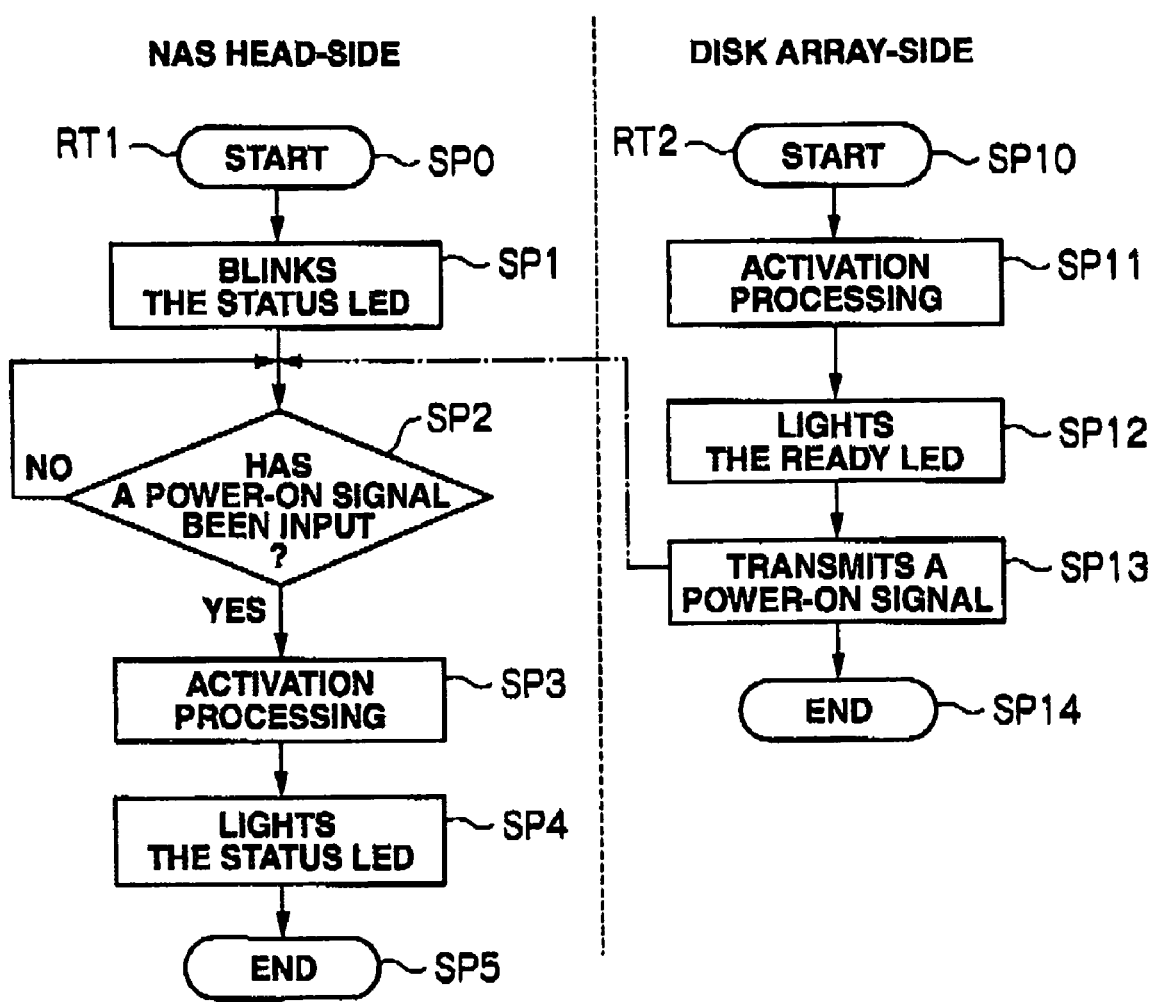
FIG. 7 is a flow chart illustrating a power-on procedure realized at a NAS head MPU and a disk array device MPU by the power source cooperation-control function according to the first embodiment.

The various processing executed at power-on on the NAS head 4 side is conducted under the control of the power control unit 56, while the various processing executed at power-on in the disk array device 5 is conducted under the control of the MPU 60. FIG. 7 is a flow chart indicating the specific contents of the control processing executed at power-on by the power control unit 56 in the NAS head 4 and the MPU 60 in the disk array device 5.

When the breaker switch 75 (FIG. 2) of the power source unit 76 (FIG. 1) is switched on, the power control unit 56 in the NAS head 4 starts, on the basis of a program stored in its own internal memory (not shown in the figure), the NAS-side power-on cooperation-control processing procedure RT1, shown on the left side in FIG. 7, from the step SP0 and, in the subsequent step SP1, it blinks the status LED 70 (FIG. 2) on the display panel 71 (FIG. 2) provided on the front face of the NAS head 4.

Then, the power control unit 56 proceeds to the step SP2, in which it waits for the start-up completion signal S1 to be input from the disk array device 5 while maintaining the standby mode of the NAS head 4. When the start-up completion signal S1 is transmitted from the disk array device 5 via the dedicated cable 80, the power control unit 56 proceeds to the step SP3 to start to supply power to the respective circuits.

As a result, upon the commencement of the power supply, the MPU 50 in the NAS head 4 starts predetermined start-up processing and the NAS head 4 starts to operate. Specifically, the MPU 50 in the NAS head 4 transmits a read request to the MPU 60 in the disk array device 5 via the data transfer control unit 53 (FIG. 5) and makes the disk drive(s) B read and write in the memory 51 a boot part of the operating system (OS) for the NAS head 4 stored in the system logical volume(s) in their disk drive(s) B. Based on the boot part of the operating system read into the memory 51, the MPU 50 reads and boots the main part of the operating system stored in the system logical volume(s). Thus, the operation mode of the NAS head 4 changes to a normal operating mode.

Then, the power control unit 56 proceeds to the step SP4 and lights the status LED 70 to indicate that the NAS head 4 is in the operating mode. Subsequently, it proceeds to the step SP5 and completes the power-on cooperation-control processing.

Figure 2:
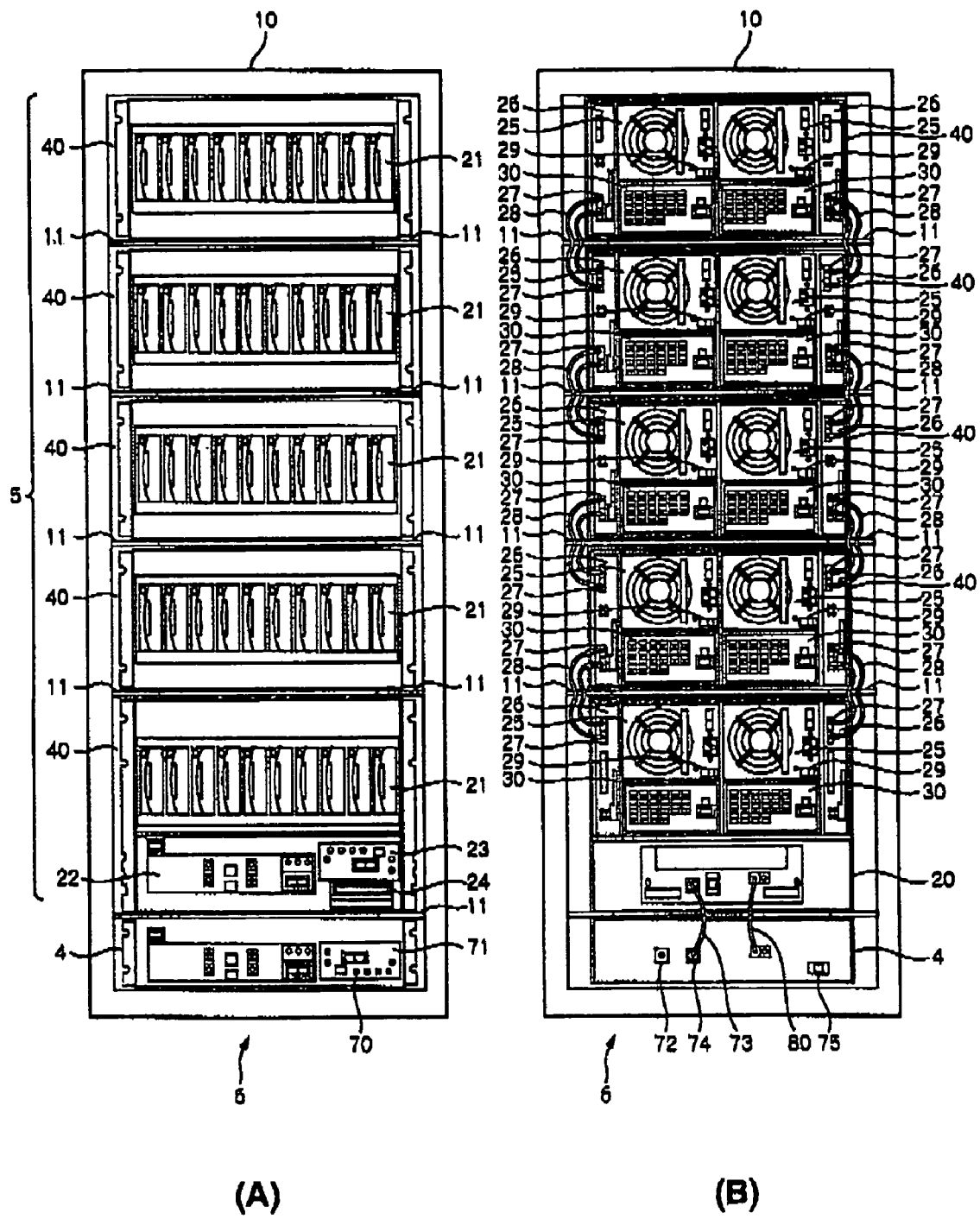
FIGS. 2(A) and (B) show front and back views of an external configuration of a storage system unit according to the first embodiment.

On the other hand, regarding the MPU 60 in the disk array device 5, when the breaker switches 29 of the power source units 25 in the basic chassis 20, previously mentioned in relation to FIG. 2, are switched on, the MPU 60 starts, on the basis of a program stored in the system memory 61 (FIG. 5), the disk-side power-on cooperation-control processing procedure RT2, shown on the left side of FIG. 7, from the step SP10. In the subsequent step SP11, the MPU 60 executes start-up processing for the disk array device 5. Specifically, the MPU 60 reads and boots an operating system (OS) for the disk array device 5 stored in the system logical volume(s) provided by the disk drive(s) 8.

When this start-up processing is completed, the MPU 60 proceeds to the step SP12 and lights the status LED 23 A (FIG. 3) on the display panel 23 (FIG. 3) provided on the front face of the basic chassis 20 (FIG. 2), to indicate that the disk array device 5 is in the ready mode.

Subsequently, the MPU 60 proceeds to the step SP13 and transmits the start-up completion signal S1 (FIG. 6) to the power control unit 56 in the NAS head 4 via the dedicated cable 80, then proceeds to the step SP14 and completes the power-on cooperation-control processing.

Figure 8:
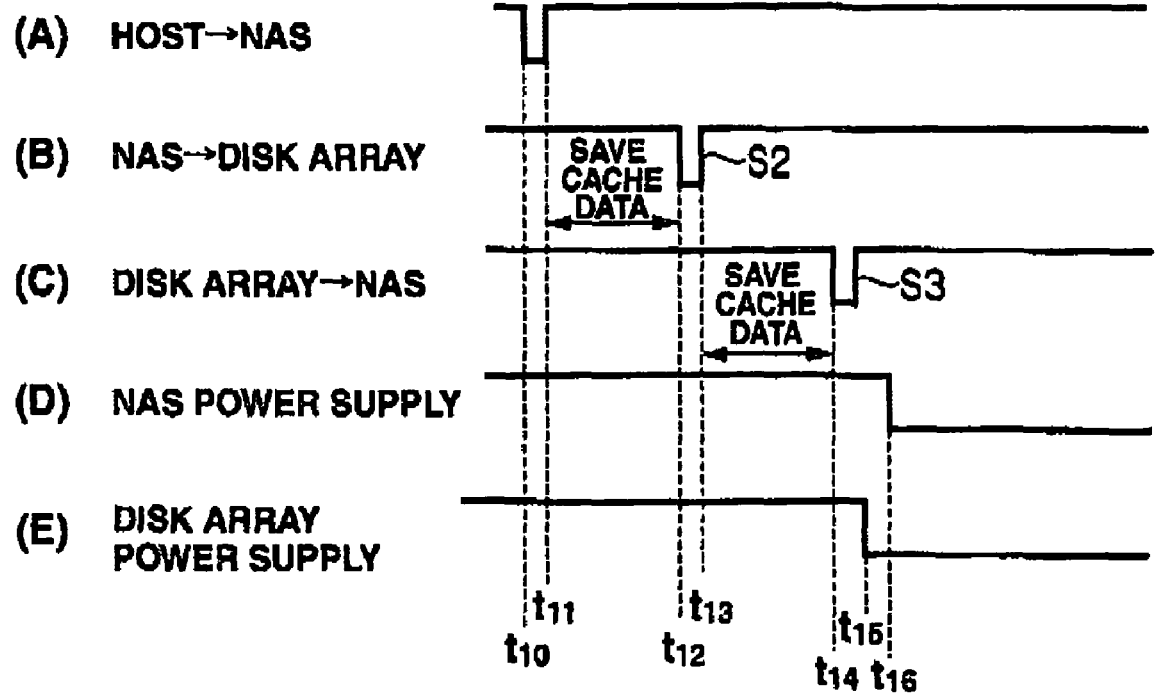
FIG. 8 is a timing chart illustrating a power-off sequence realized by the power source cooperation-control function according to the first embodiment.

FIG. 8 shows a power-off sequence realized by the power cooperation-control function when a command requesting power-off (hereinafter called the "power-off command") is given from a host computer 2 to the NAS head 4.

When a power-off command is transmitted from a host computer 2 (time $t_{10}$ in FIG. 8(A)), the NAS head 4 first reads, from the cache memory 52 (FIG. 5), the data to be written to the disk drive(s) 8 in the disk array device 5 (hereinafter simply called the "cache data"), and transmits it to the disk array device 5 with a block write request (time $t_{11}$ and $t_{12}$ in FIG. 8(B)). When it completes transmission of the cache data to the disk array device 5, it transmits, via the dedicated cable 80 to the disk array device 5, a signal S2 requesting that the disk array device 5 turn its power off (hereinafter called the "first power-off signal") (time $t_{12}$ in FIG. 8(B)).

Having received the first power-off signal S2, the disk array device 5 stores the cache data to be written to the disk drive(s) 8, which exists in the disk array device's cache memory 66 (FIG. 5), in a relevant storage area provided by the disk drive(s) 8 (time $t_{13}$ and $t_{14}$ in FIG. 8(C)) and then transmits, via the dedicated cable 80 to the NAS head 4, a signal S3 (hereinafter called the "second power-off signal") requesting that the NAS head turn its power off (time $t_{14}$ in FIG. 8(C)). Then, the disk array device 5 turns its power off and stops operation (time $t_{15}$ in FIG. 8(E)).

Having received the second power-off signal S3, the NAS head 4 turns its power off and stops operation (time $t_{16}$ in FIG. 8(D)). Hereby, the NAS head 4 stops operation almost at the same time as the disk array device 5, and accordingly, there will be no problem arising from the situation where only the disk array device 5 stops operation. Moreover, because the NAS head 4 saves the cache data in the disk array device 5 before the disk array device 5 stops operation, problems such as data loss that may occur in the situation where the disk array device 5 stops operation before the NAS head 4 can be prevented.

The aforementioned various processing executed at power off in the NAS head 4 is conducted under the control of the MPU 50, while the various processing executed at power off in the disk array device 5 is conducted under the control of the MPU 60. FIG. 9 is a flow chart indicating the specific contents of the control processing executed at power off by the MPU 50 in the NAS head 4 and the MPU 60 in the disk array device 5.

Having received the power-off command from any one of the host computers 2, the MPU 50 in the NAS head 4 starts, on the basis of a program stored in the memory 51, the NAS-side power-off cooperation-control processing procedure RT3, shown on the left side in FIG. 9, from the step SP 20. In the subsequent step SP21, the MPU 50 makes the cache memory 52 read the cache data to be written to the disk drive(s) 8 in the disk array device 5 (the cache data existing in the cache memory 52), and transmit it to the disk array device 5 with a block write request.

Then, the MPU 50 proceeds to the step SP22 and controls the power control unit 56 so that it transmits the first power-off signal S2 (FIG. 8) to the MPU 60 in the disk array device 5 via the dedicated cable 80, then proceeds to the step SP23 and waits for the second power-off signal S3 from the disk array device 5.

When the MPU 50 is notified by the power control unit 56 of that the second power-off signal S3 has been received from the disk array device 5, it proceeds to the step SP24 and executes predetermined termination processing to power off the NAS head 4. Incidentally, this termination processing includes processing to stop power-supply to the respective circuits by controlling the power control unit 56.

When the termination processing finishes, the MPU 50 proceeds to the step SP25 and completes the power-off cooperation-control processing.

On the other hand, regarding the MPU 60 in the disk array device 5, when the first power-off signal S2 is transmitted from the NAS head 4, it starts, on the basis of a program stored in the memory 61, the disk-side power-off cooperation-control processing procedure RT4, shown on the right side in FIG. 9, from the step SP30. In the subsequent step SP31, the MPU 60 controls the data transfer control unit 63 so that it reads the cache data to be written in the disk drive(s) 8, the cache data existing in the cache memory 66, and transmits it with a block write request to the disk drive(s) 8 to be written thereto.

Then, the MPU 60 proceeds to the step SP31 and transmits, via the dedicated cable 80, the second power-off signal S3 to the power control unit 56 in the NAS head 4, and proceeds to the step SP33 to execute predetermined termination processing to power off the disk array device 5.

When this termination processing finishes, the MPU 60 then proceeds to the step SP34 and completes the power-off cooperation-control processing.

(1-3) Operations and Effects of First Embodiment

In the storage system unit 6 according to the first embodiment having the above configuration, the disk array device 5 transmits, after its start-up, the start-up completion signal S1 to the NAS head 4, while the NAS head 4 does not immediately start to operate even when the breaker switch 75 (FIG. 2) is switched on and the power is turned on but enters standby mode and waits for the start-up completion signal S1 from the disk array device 1. The NAS head 4 starts to operate after receiving the start-up completion signal S1.

Moreover, in the storage system unit 6, when a power-off command is transmitted from a host computer 2, the NAS head 4 saves the cache data in the disk array device 5 before transmitting the first power-off signal S2 to the disk array device 5. While the disk array device 5 saves, in response to the first power-off signal S2, the cache data in the disk drive(s) 8, transmits the second power-off signal S3 to the NAS head 4, and stops operation. The NAS head 4 stops operation after receiving this second power-off signal S3.

Accordingly, with this storage system unit 6, when the power is turned on, it is possible to have the NAS head 4 not be recognized by the host computers 2 until the disk array device 5 completes the start-up, and even when the NAS head 4 and the disk array device 5 are powered on with different timings, problems arising from the situation where only the NAS head 4 is operating can be prevented. Moreover, when the power is turned off, the cache data in the NAS head 4 and the cache data in the disk array device 5 are saved before powering-off the NAS head 4 and the disk array device 5 at almost the same time, thereby enabling the prevention of problems such as data loss that may occur in the situation where the disk array device 5 stops operation before the NAS head 4.

Furthermore, for the execution of the power cooperation-control, the storage system 6 does not require, other than the NAS head 4 and the disk array device, controllers executing power cooperation-control processing, therefore, undesirable issues such as the upsizing of the system due to using such further controllers can be avoided.

With such a configuration, the occurrence of the problems arising from the situation where, at power-on, the NAS head 4 starts to operate before the disk array device 5 and, at power-off, the disk array device 5 stops operation before the NAS head 4, can be prevented without fail. Accordingly, it becomes possible to realize a storage system having high reliability.

(2) SECOND EMBODIMENT

Figure 10:
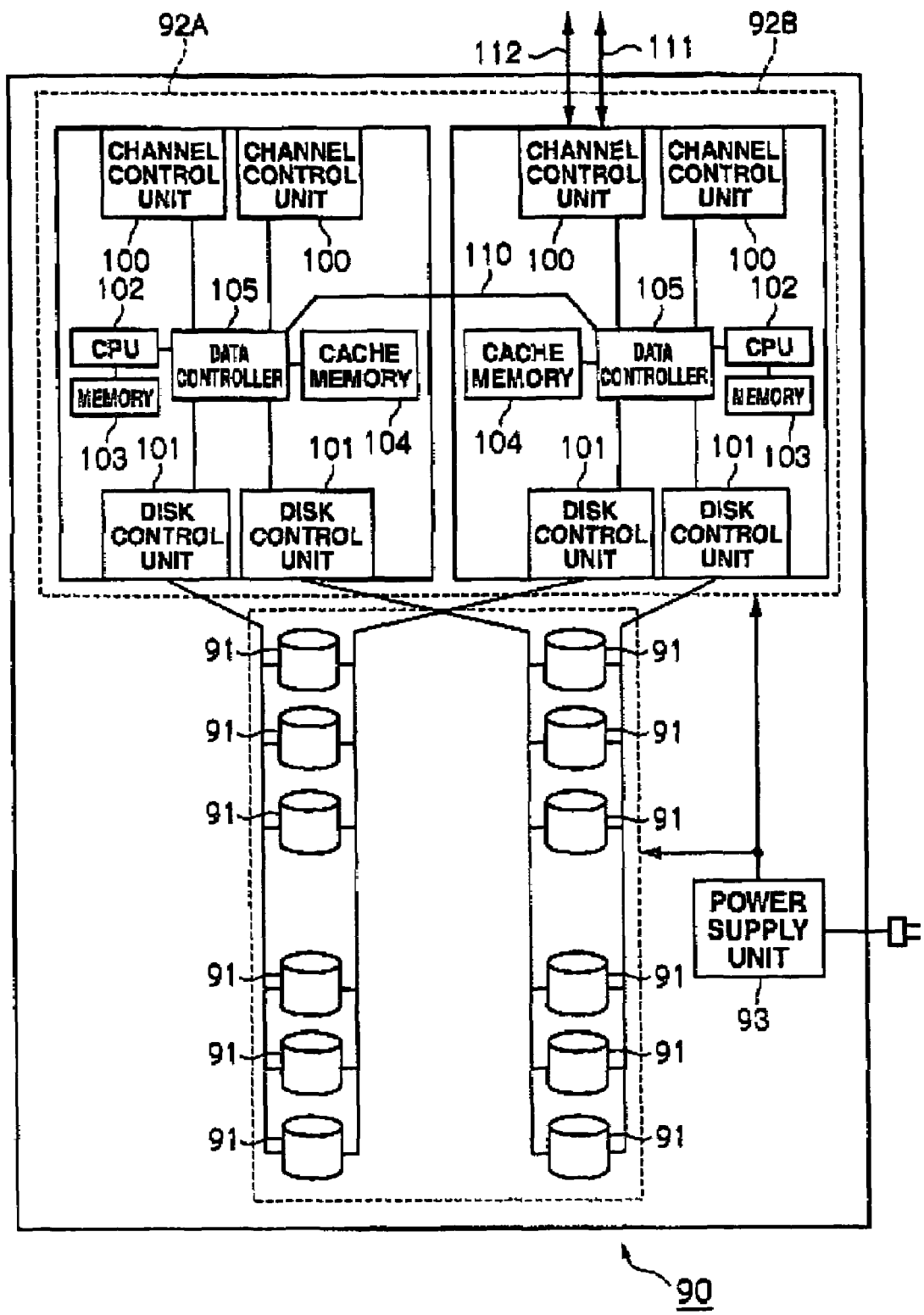
FIG. 10 is a block diagram showing a configuration of a disk array device according to a second embodiment.

FIG. 10 shows an internal configuration of a disk array device 90 according to the second embodiment of the present invention, which is applied to the NAS network system 1 (FIG. 1) in place of the disk array device 5 (FIG. 5) according to the first embodiment.

This disk array device 90 is composed of: a plurality of disk drives 91 as storage devices managed by a RAID system; two controllers 92A and 92B for controlling data read/write from/to the disk drives 91; and a power source unit 93 for supplying power to the respective disk drives 91 and the controllers 92A and 92B.

Each of the controllers 92A and 92B has: a plurality of channel control units 100; a plurality of disk control units 101; a CPU 102; a memory 103; a cache memory 104; and a data controller 105.

Each of the channel control units 100 is an interface for communication with the NAS head 4 (FIG. 5) and has a function almost as the same as that of the host interface control unit 65 in the disk array device 5 according to the first embodiment.

Each of the disk control units 101 is an interface for controlling protocols between the controllers 92A and 92B and the respective disk drives 91. It has a function of transmitting data input/output requests to the disk drives 91 in accordance with a protocol regulating commands for controlling the disk drives 91.

The CPU 102 is in charge of controlling the entire disk array device 90 and executes a micro program stored in the memory 103 to control the channel control units 100, the disk control units 101, the data controller 105 and the like. The micro program refers to data read processing and data write processing.

Incidentally, the memory 103, cache memory 104 and data controller 105 have almost the same functions as the memory 61 (FIG. 5), the cache memory 66 (FIG. 5) and the data transfer control unit 63 (FIG. 5) in the disk array device 5 according to the first embodiment, therefore their explanations are omitted.

The controllers 92A and 92B are connected to each other via a high-speed bus 110 and they transmit information to each other via this high-speed bus 110 to share their processing work so that the processing loads on the respective CPUs 102 can be reduced.

In each of the controllers 92A and 92B, assuming that there are two disk control units 101, one is connected to the half of the disk drives 91 by FC-AL 506, and the other is connected to the other half of the disk drives 91 by FC-AL 506. Accordingly, even if there is trouble with one of the controllers 92A and 92B, it is possible to avoid problems in data reading/writing from/to the disk drives 91.

Figure 4:
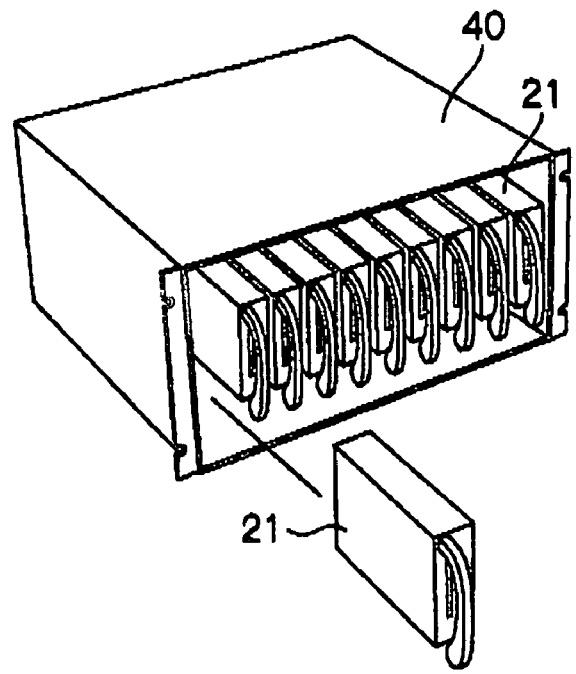
FIGS. 4(A) and (B) show an exploded perspective view of a configuration of an additional chassis of the disk array device.
Figure 4:
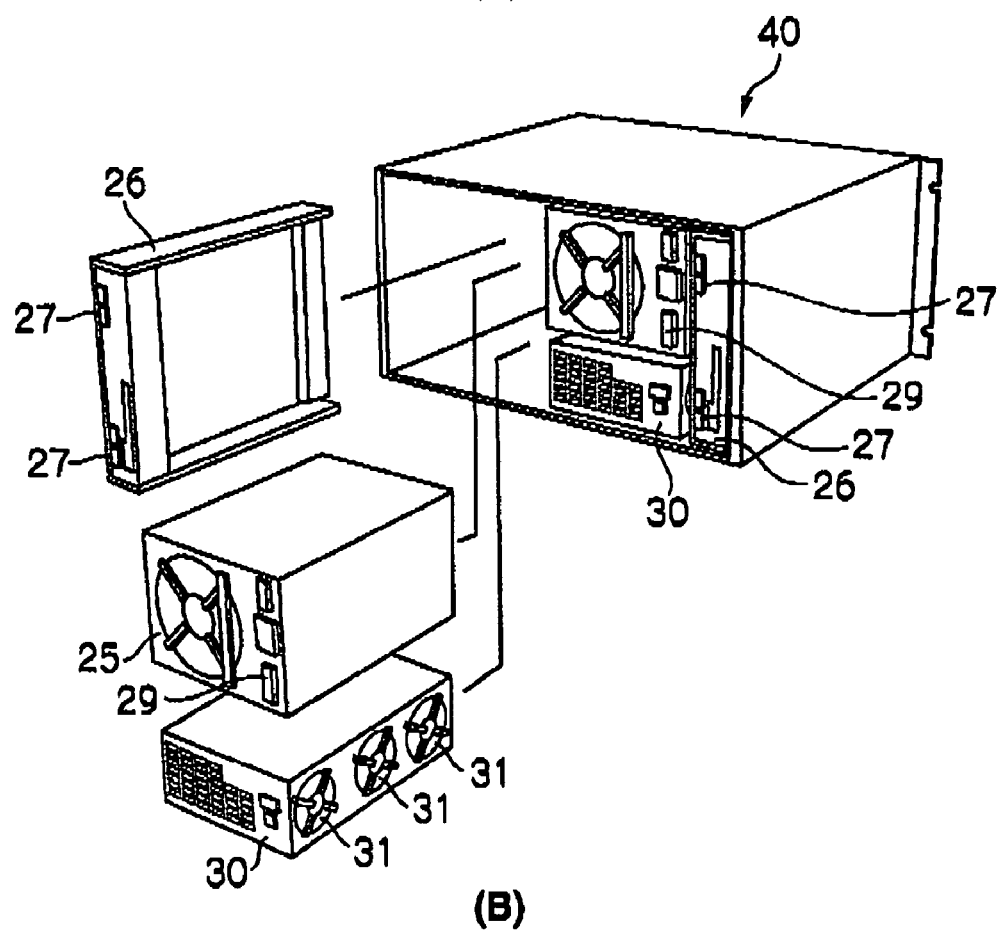

In this disk array device 90, one of the channel control units 100 in either the controller 92A or the controller 92B is connected, via a data communication cable 111 and a dedicated cable 112, to the CPU/PCI bridge 53 (FIG. 4) and the power control unit 56 (FIG. 4) in the NAS head 4 (FIG. 4). The respective memories 103 of the controllers 92A and 92B store the programs for executing the power cooperation-control, explained in relation to FIGS. 6 through 9. Therefore, the CPUs 102 in the controllers 92A and 92B connected to the NAS head 4 execute, on the basis of the programs stored in the memories 103 in the controllers 92A and 92B, the power cooperation-control processing described above in relation to FIGS. 6 through 9. Thus, the disk array device 90 is configured so that the power can be turned on/off in a cooperative manner with the NAS head 4.

Accordingly, even in the case of a so-called dual controller configuration such as the disk array device 90 having the two controllers 92A and 92B, problems arising from the situation where, at power-on, the NAS head 4 starts to operate before the disk array device 90 and, at power-off, the disk array device 90 stops operation before the NAS head 4, can be prevented without fail. Thereby, it becomes possible to realize a storage system unit having high reliability, (4) OTHER EMBODIMENTS The aforementioned first and second embodiments were explained regarding the case where the storage system unit 6 is configured having only one disk array device 5 or 90 connected to the NAS head 4. However, the present invention is not limited to that case, but can also be applied to the case where the storage system unit 6 is configured having a plurality of disk array devices 5 or 90 connected to the NAS head 4. In this case, the NAS head 4 may be configured so that, at power-on, the MPU 50 therein starts to operate after receiving the start-up completion signals S1 from all the disk array devices 5 or 90 connected to the NAS head 4, while, at power-off, the MPU 50 starts the termination processing after transmitting the first power-off signals S2 to all the disk array devices 5 and receiving the second power-off signals S3 therefrom.

The first and second embodiments were also explained regarding the case where the NAS head 4 and the disk array device 5 or 90 are connected to each other via the dedicated cable 80 or 112, and the power control unit 56 in the NAS head 4 and the MPU 60 in the disk array device 5 or the CPUs 102 in the disk array device 90 transmit the start-up completion signals S1 and the first and second power-off signals S2 and S3 via the dedicated cable 80 or 112. However, the present invention is not limited to this case. For example, the NAS head 4 and the disk array device 5 or 90 may be connected to each other via a radio channel so that the power control unit 56 in the NAS head 4 and the MPU 60 in the disk array device 5 or the CPUs 102 in the disk array device 90 transmit the start-up completion signals S1 and the first and second power-off signals S2 and S3 via this radio channel.

Furthermore, the first embodiment was explained regarding the case where the operating system for the NAS head 4 is stored in the disk drive(s) 8 in the disk array device 5. However, the present invention is not limited such cases and the operating system may be stored in the memory 51 in the NAS head 4. However, when the operating system for the NAS head 4 is stored in the disk drive(s) 8 in the disk array device 5, even if the NAS head 4 is configured in such a way that the power control unit 56 therein starts to supply power to the MPU 5 immediately after the breaker switch 75 (FIG. 2) of the power source unit 76 (FIG. 1) is switched on, the NAS head 4 cannot read the operating system from the disk drive(s) 8 in the disk array device 5 until the disk array device 5 completes the start-up. Accordingly, even if the NAS head 4 and the disk array device 5 are powered on with different timings, problems arising from the situation where the NAS head 4 starts to operate before the disk array device 5 can be prevented.

The present invention can be widely applied to, in addition to the storage system composed of the NAS head and the disk array device(s), various kinds of storage systems having storage controllers for storing data and adapters for controlling input/output of data between host systems and the storage controllers.

We claim:

1. A storage system comprising a storage controller for storing data and a network attached storage (NAS) adapter for controlling data input/output between a host system and the storage controller, wherein:

the storage controller transmits a predetermined start-up completion signal to the NAS adapter after the storage controller starts to operate; and the NAS adapter starts to operate after receiving the start-up completion signal from the storage controller;

wherein the NAS adapter includes a control unit for executing predetermined start-up processing to start up the NAS adapter, and a power control unit for controlling power-supply to the control unit;

after the NAS adapter receives the start-up completion signal from the storage controller, the power control unit starts to supply power to the control unit; and the control unit starts the start-up processing when supplied with power from the power control unit.

2. The storage system according to claim 1, comprising a plurality of the storage controllers, each being connected to the NAS adapter, wherein the NAS adapter starts to operate after receiving the start-up completion signal from all the storage controllers.

3. A storage system comprising a storage controller for storing data and a network attached storage (NAS) adapter for controlling data input/output between a host system and the storage controller, wherein:

the storage controller transmits a predetermined start-up completion signal to the NAS adapter after the storage controller starts to operate; and the NAS adapter starts to operate after receiving the start-up completion signal from the storage controller wherein the storage controller stores an operating system for the NAS adapter; and after the NAS adapter receives the start-up completion signal from the storage controller, the NAS adapter reads the operating system from the storage controller and starts to operate.

4. A storage system comprising a storage controller and an adapter for controlling input/output of data between a host system and the storage controller, wherein the storage controller has a storage device for storing the data, and a first cache memory for temporarily storing the data when the data is transferred between the adapter and the storage device;

the adapter has a second cache memory for temporarily storing the data when the data is transferred between the host system and the storage controller;

wherein, when the adapter initiates stop of operation, the adapter transfers the data stored in the second cache memory to the storage controller, and transmits a predetermined first signal to the storage controller;

wherein, in response to the first signal from the adapter, the storage controller has the storage device store the data stored in the first cache memory, transmits a predetermined second signal to the adapter, and stops operation; and wherein, the adapter stops operation after receiving the second signal.

5. The storage system according to claim 4, comprising a plurality of the storage controllers, each being connected to the adapter, wherein the adapter transmits the first signal to all the storage controllers and the adapter stops operation after receiving the second signal from all the storage controllers.

6. A power control method for a storage system that comprises a storage controller for storm data and a network attached storage (NAS) adapter for controlling input/output of data between a host system and the storage controller, the method comprising:

a first step in which the storage controller transmits a predetermined start-up completion signal to the NAS adapter after the storage controller starts to operate;

a second step in which the NAS adapter starts to operate after receiving the start-up completion signal from the storage controller;

the NAS adapter comprises a control unit for executing predetermined start-up processing to start up the NAS adapter, and a power control unit for controlling power-supply to the control unit;

in the second step, after the NAS adapter receives the start-up completion signal from the storage controller, the power control unit starts to supply power to the control unit; and the control unit starts the start-up processing when supplied with power from the power control unit.

7. The power control method for the storage system according to claim 6, wherein the storage system comprises a plurality of the storage controllers, each being connected to the NAS adapter;

the NAS adapter starts to operate after receiving the start-up completion signal from all the storage controllers.

8. A power control method for a storage system that comprises a storage controller for storing data and a network attached storage (NAS) adapter for controlling input/output of data between a host system and the storage controller, the method comprising:

a first step in which the storage controller transmits a predetermined start-up completion signal to the NAS adapter after the storage controller starts to operate;

a second step in which the NAS adapter starts to operate after receiving the start-up completion signal from the storage controller;

the storage controller stores an operating system for the NAS adapter; and after the NAS adapter receives the start-up completion signal from the storage controller, the NAS adapter reads the operating system from the storage controller and starts to operate.

9. A power control method for a storage system that comprises a storage controller and an adapter for controlling input/output of data to/from the storage controller in response to an external request for input/output of data in files, wherein;

the storage controller comprises a storage device for storing data, and a first cache memory for temporarily storing the data when the data is transferred between the adapter and the storage device; and the adapter comprises a second cache memory for temporarily storing the data when the data is transferred between the outside and the storage controller, the method comprising:

a first step in which, when the adapter initiates stop of operation, the adapter transfers the data stored in the second cache memory to the storage controller, and transmits a predetermined first signal to the storage controller;

a second step in which, in response to the first signal from the adapter, the storage controller has the storage device store the data stored in the first cache memory, transmits a predetermined second signal to the adapter, and stops operation; and a third step in which the adapter stops operation after receiving the second signal.

10. A power control method for the storage system according to claim 9, wherein:

the storage system comprises a plurality of storage controllers, each being connected to the adapter and wherein;

in the first step, the adapter transmits the first signal to all the storage controllers; and in the third step, the adapter stops operation after receiving the second signal from all the storage controllers.

11. An adapter for controlling input/output of data between a host system and a storage controller for storing data, the adapter comprising:

a cache memory for temporarily storing the data when the data is transferred between the host system and the storage controller, wherein, when the adapter initiates stop of operation, the adapter transfers the data stored in the cache memory to the storage controller, transmits a predetermined first signal to the storage controller, receives a predetermined second signal that is transmitted in response to the first signal, from the storage controller before the storage controller stops operation, and stops operation.

12. A power control method for an adapter that controls input/output of data between a host system and a storage controller for storing data, wherein the adapter comprises a cache memory for temporarily storing the data when the data is transferred between the host system and the storage controller, the method comprising:

a first step of transferring, when the adapter initiates stop of operation, the data stored in the cache memory to the storage controller and transmitting a predetermined first signal from the adapter to the storage controller; and a second step of the adapter stopping operation after receiving a predetermined second signal that is transmitted, in response to the first signal, from the storage controller before the storage controller stops operation.

13. A storage controller comprising:

a storage device for storing data transmitted from a host system; and a cache memory for temporarily storing the input/output of data to/from the storage device, wherein, in response to a first signal transmitted from an adapter before the adapter stops operation, the adapter controlling input/output of data between the host system and the storage device, the storage controller has the storage device store the data stored in the cache memory, transmits a predetermined second signal to the adapter, and stops operation.

14. A control method for a storage controller that comprises a storage device for storing data transmitted from a host system and a cache memory for temporarily storing the input/output of data to/from the storage device, the method comprising:

a first step of having the storage device store the data stored in the cache memory, in response to a first signal that is transmitted from an adapter when the adapter initiates stop of operation, the adapter controlling input/output of data between the host system and the storage controller; and a second step of having the storage controller stop operation after transmitting a predetermined second signal to the adapter.

* * * * *